Oct. 31, 1950     C. W. WALZ ET AL     2,527,862
FERTILIZER DISTRIBUTOR

Filed April 6, 1946     4 Sheets-Sheet 1

INVENTOR
JAMES H. CLARK
CLAUDE W. WALZ
BY
ATTORNEYS

Oct. 31, 1950     C. W. WALZ ET AL     2,527,862
FERTILIZER DISTRIBUTOR
Filed April 6, 1946                                4 Sheets-Sheet 2
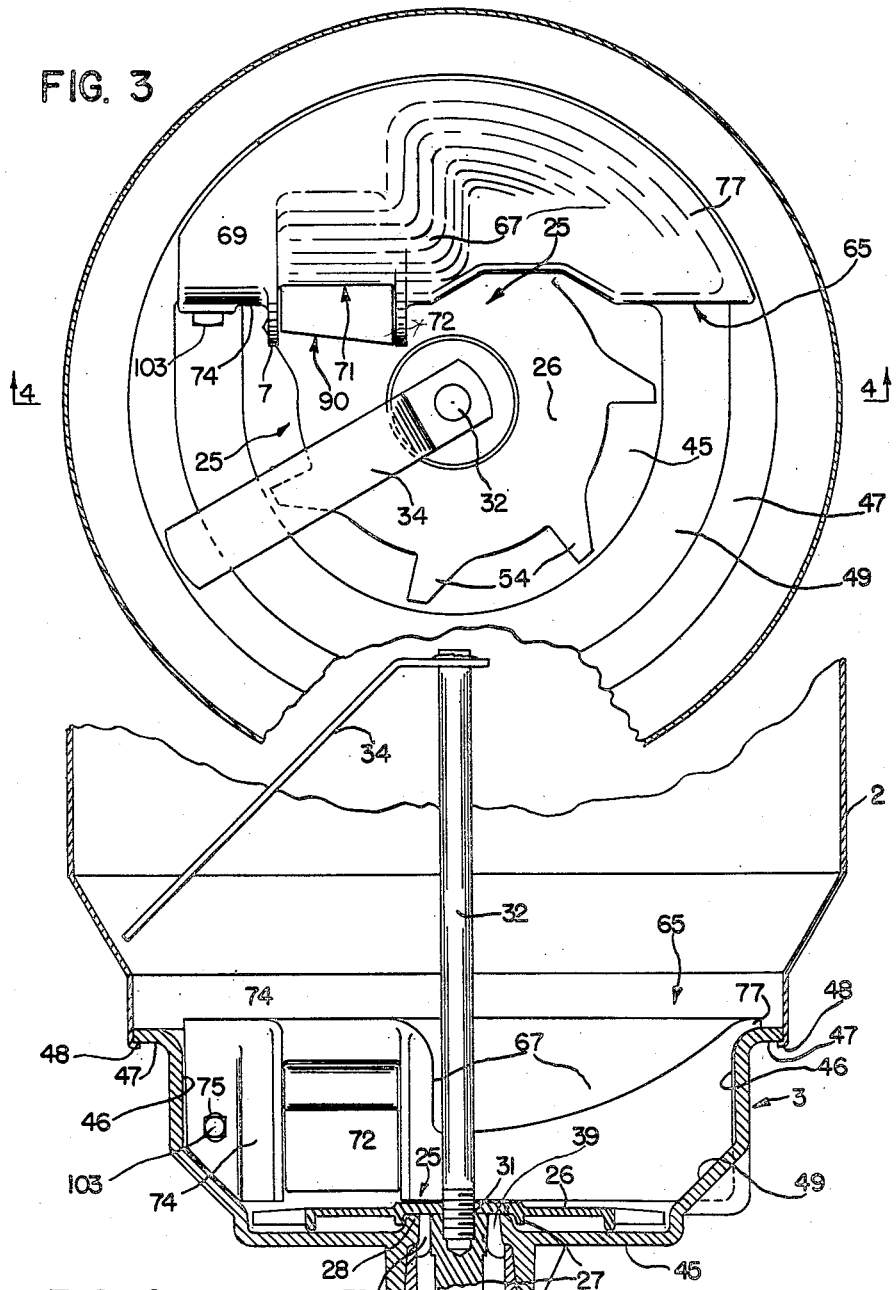
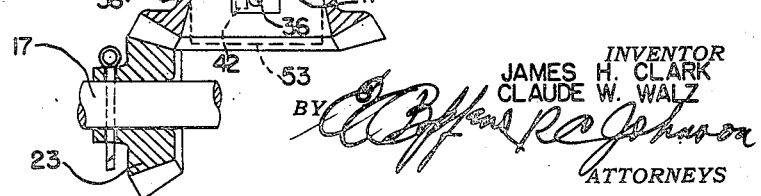
INVENTOR
JAMES H. CLARK
CLAUDE W. WALZ
BY
ATTORNEYS Oct. 31, 1950     C. W. WALZ ET AL     2,527,862
FERTILIZER DISTRIBUTOR Filed April 6, 1946     4 Sheets-Sheet 4

INVENTORS.
JAMES H. CLARK
CLAUDE W. WALZ
BY
ATTORNEYS

Patented Oct. 31, 1950

2,527,862

UNITED STATES PATENT OFFICE 2,527,862

FERTILIZER DISTRIBUTOR

Claude W. Walz, Rock Island, and James H. Clark, Moline, Ill., assignors to Deere & Company, Moline, Ill., a corporation of Illinois Application April 6, 1946, Serial No. 660,160

13 Claims. (Cl. 222—239)

The present invention relates generally to agricultural implements and more particularly to distributing mechanism especially adapted to serve as means for distributing fertilizer, as during planting of seed or when side dressing row crops, or the like.

The object and general nature of the present invention is the provision of a new and improved fertilizer distributor which is simple and sturdy, involves only a few parts and is readily assembled during manufacture and also may readily be disassembled for the purpose of cleaning fertilizer therefrom after use. More specifically, it is an important feature of this invention to provide a fertilizer distributor of the type having a pivoted gate movable adjacent a discharge opening into different positions relative thereto for controlling the flow of fertilizer through the discharge opening, and it is a further feature of this invention to provide a gate construction in which the bearing trunnions and arm for operating the gate are formed generally integrally therewith. Thus, the number of parts is reduced and the cost of assembly and manufacture is decreased, especially as compared with conventional fertilizer distributors.

A further feature of this invention is the provision of new and improved agitator means which assures a steady flow of fertilizer through the device.

These and other objects and advantages of the present invention will be apparent to those skilled in the art after a consideration of the following detailed description, taken in conjunction with the accompanying drawings in which the principles of the present invention have been illustrated.

In the drawings:

Figure 3 is a top or plan view, looking down on the inside of the hopper.

Figure 4 is a section taken generally along the line 4—4 of Figure 3.

Figure 1:
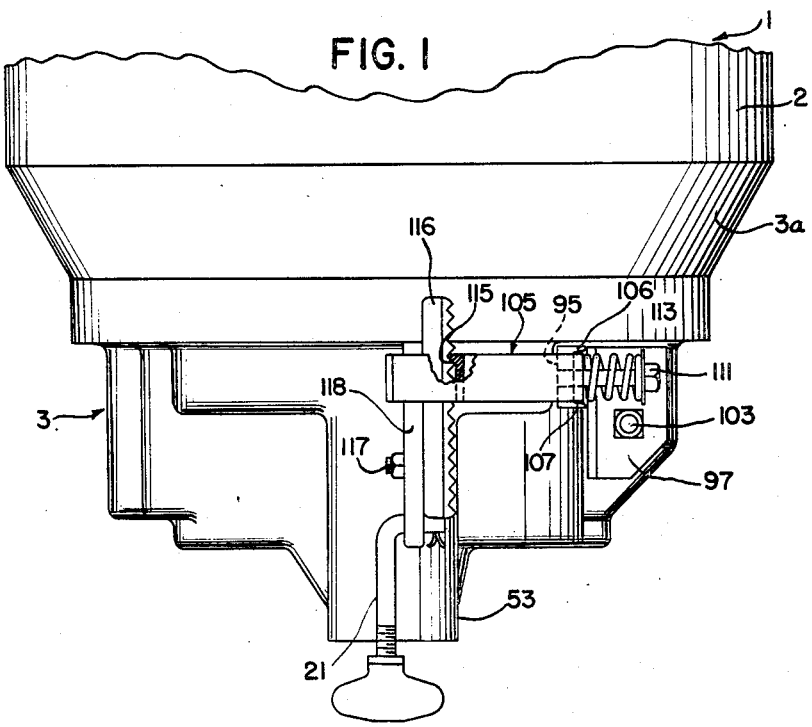
Figure 1 is a rear view of a fertilizer hopper and distributor construction in which the principles of the present invention have been incorporated.
Figure 2:
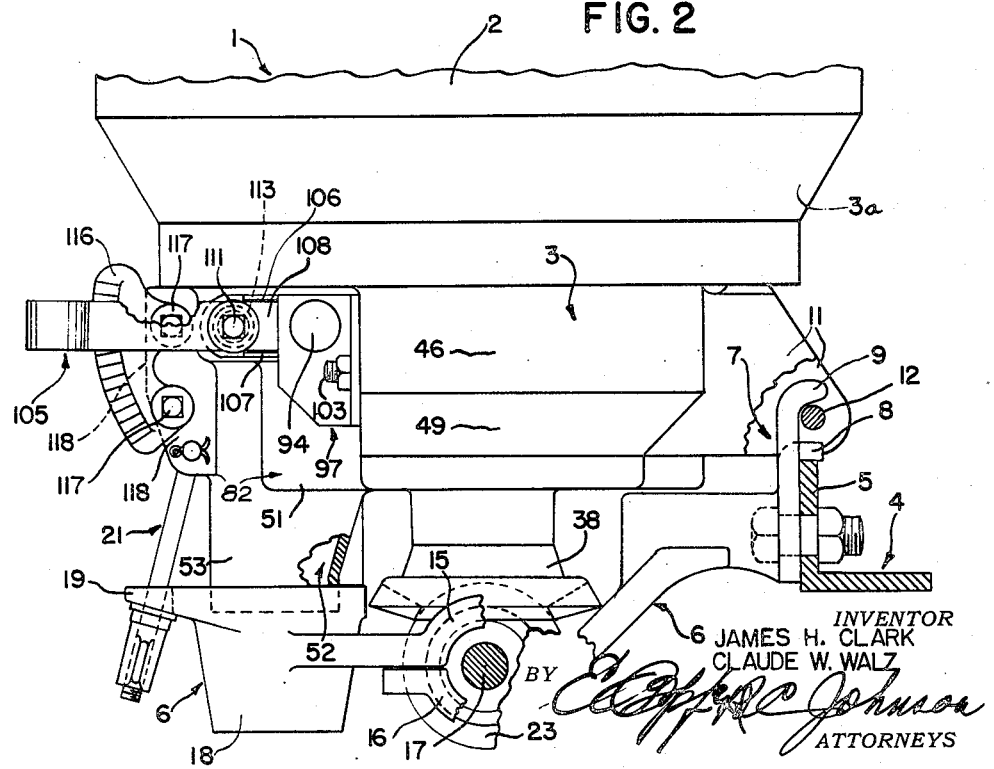
Figure 2 is a side view of the fertilizer distributor shown in Figure 1.
Figure 5:
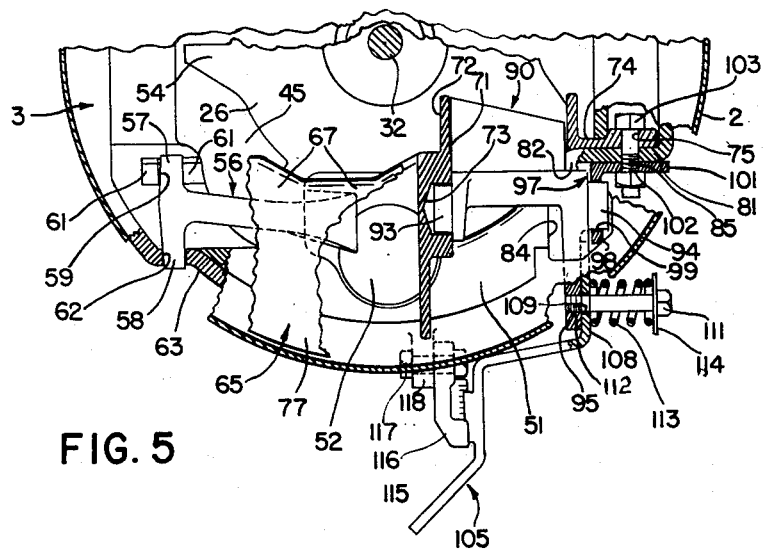
Figure 5 is a view, partly in section and partly in elevation, taken generally along the line 5—5 of Figure 4.
Figure 7:
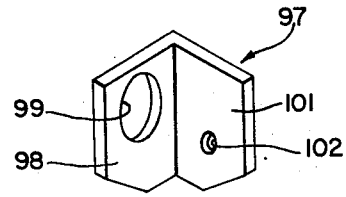
Figure 7 is a perspective view of the detachable gate-supporting bearing.

Referring to the drawings, particularly Figures 1 and 2, the fertilizer distributor comprises a hopper indicated in its entirety by the reference numeral 1 adapted to contain dry fertilizer or other suitable material and includes a can 2 mounted on a base or support in the form of a hopper bottom 3. As illustrated in the drawings, the fertilizer distributor is mounted on the frame 4 of a planter or the like, the frame 4 including a supporting angle member 5 to which a bracket 6 is fixed in any suitable manner. Preferably, the bracket 6 has a pair of extensions 7 adapted to hook over the angle member 5, each extension 7 including a laterally extending lug 8. Also, each extension 7 includes an upwardly extending hook-like lug 9, and the hooks 9 are adapted to enter between cooperating portions 11 formed on the hopper bottom 3, as best shown in Figure 2, such portions 11 being apertured to receive a hinge pin 12 that engages under the hooks or lugs on the bracket 6. The bracket 6 also includes upwardly arched bearing sections 15 which are completed by bearing caps 16, these portions receiving a drive shaft 17 which drives the fertilizer feeding mechanism and associated parts. Also, the hopper bottom bracket 6 includes a spout section 18 of generally downwardly tapered configuration, and this section has a slotted lug 19 adapted to receive a hopper bottom tie member 21 which, as will be explained in more detail later, serves to fasten the hopper to the bracket 6. The hopper bottom 3 tapers outwardly and upwardly, as at 3a, Figures 1 and 2, so that the portion to which the lower part of the can 2 is attached is larger in diameter than the lower portion. The upper part of the can 2 is closed by a cover (not shown). A drive pinion 23 is fixed to the drive shaft 17 between the bearing sections 15 of the bracket 6 and serves to drive the fertilizer feeding mechanism.

The fertilizer feeding mechanism, indicated in its entirety in Figure 3 by the reference numeral 25, includes a star wheel 26 having a depending hub section 27 mounted for rotation in a central flanged portion 28 of the hopper bottom 3. The hub section 27 is provided with a central threaded recess 31 into which the lower end of an agitator shaft 32 is screwed so as to form a normally permanent connection. The shaft 32 extends upwardly for a considerable distance within the hopper and at its upper end is fixed to a downwardly and outwardly extending agitator blade 34. Preferably, the upper end of the agitator blade 34 is welded to the upper end of the agitator shaft 32 and, as best shown in Figure 4, the agitator blade 32 extends downwardly and laterally outwardly so that the lower and outer portion thereof moves fairly closely adjacent to the can bottom, whereby substantially the entire contents of the can are subjected to the action of the agitator blade 34. The lower portion of the star wheel hub 27 is provided with a transverse opening in which a pin 36 is disposed, either by a press fit or through other means by which the pin becomes a normally permanent part of the star wheel hub. The pin 36 serves to provide a connection between the lower end of the star wheel hub 27 and a bevel gear member 38 which meshes with the drive pinion 23 on the shaft 17. The upper portion of the hub of the fertilizer distributor gear 38 is slotted, as at 39. The slots 39 extend downwardly through a central web 41 which on its lower face carries a pair of driving lugs 42 spaced from the lower ends of the slots 39. By this means, the drive gear 38 may be interconnected with the lower pinned end of the star wheel hub with what might be termed a bayonet type joint whereby not only is the drive gear 38 connected with the star wheel 26 but, additionally, the connection is such that the gear is interlocked with the star wheel so that both are connected with the hopper bottom but may be released therefrom merely by turning one relative to the other until the ends of the pin 36 come into registry with the slots 39, whereupon the parts may be separated.

The hopper bottom 3 includes a generally flat bottom wall 45 and side walls 46 which taper upwardly and outwardly, as at 49, terminating in a flange 47 over which the lower edge portions 48 of the can 2 are crimped. The bottom wall 45, and an adjacent shelf section 51 formed in the front side of the hopper bottom, is provided with a discharge opening 52 leading into a downwardly extending spout section 53 which in operation nests in the spout section 18 of the bracket 6. The discharge opening 52 is disposed so that the toothed portions 54 of the star wheel 26 pass thereover, whereby material is fed by the star wheel into and through the discharge opening 52. A knocker 56 is pivotally mounted adjacent the discharge opening 52 and includes a pair of trunnion sections 57 and 58, one of which is disposed in the upwardly extending notch 59 formed between a pair of lugs 61 carried by the hopper bottom. The other trunnion section of the knocker 56 extends laterally outwardly through or into an opening 62 formed in one of the side walls 63 of the shelf section 51.

A shield member 65 is disposed over the discharge opening 52 and the knocker 56 in the hopper bottom 3. The shield member 65 is so formed as to overlie a portion of the star wheel 26, as best shown in Figure 3. The shield 65 includes downwardly converging wall sections 67 which terminate adjacent and serve to direct downwardly flowing material to the generally peripheral portions of the star wheel, and adjacent the downwardly converging wall portions 67 is a gate enclosing box section 69. This portion is provided with a generally vertically extending slot 71, one side wall 72 of which is provided with a blind opening 73, and at the other side a vertical wall section 74 is provided with a through opening or slot 75. The peripherally flanged portion 77 of the hopper bottom shield member 65 is formed to fit snugly against the upwardly and outwardly flanged portion of the hopper bottom 3 when the shield member is mounted in position. When so mounted in position, the vertical wall 74 of the shield member 65 lies substantially flat against a vertical wall section 81 of an inwardly recessed section 82 of the hopper bottom 3. Adjacent the vertical wall section 81, the inwardly recessed portion 82 of the hopper bottom 3 is provided with a substantial opening 84. The vertical wall section 81 is provided with an opening 85 that is adapted to register with the opening 75 in the hopper bottom shield when the latter is in position.

Figure 6:
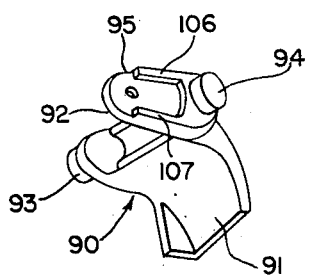
Figure 6 is a perspective view of the flow-controlling gate per se.
Figure 8:
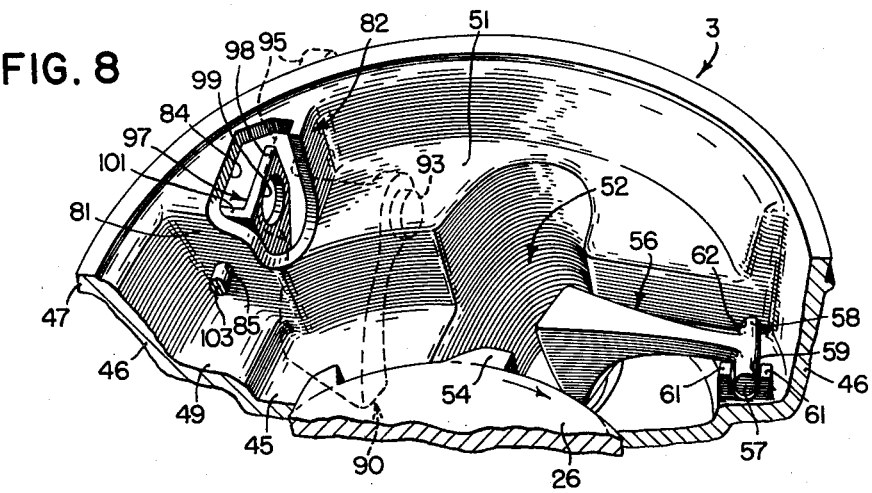
Figures 8, 9 and 10 are detail perspective views of the hopper bottom and shield member.
Figure 9:
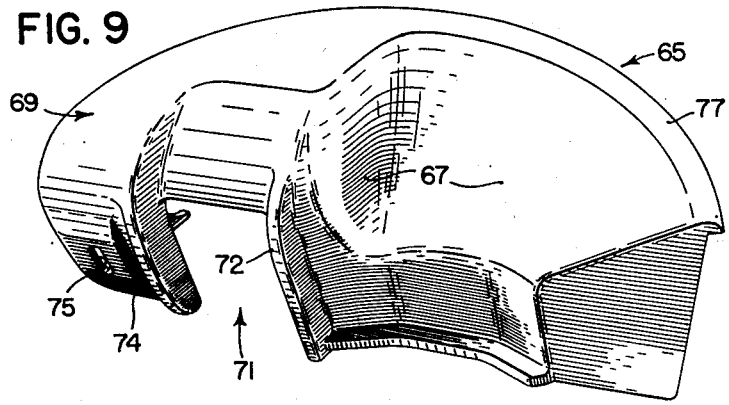
Figure 12:
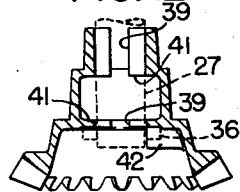
Figures 11 and 12 are fragmentary detail views showing the connections between the driving gear and the hub that drives the seeding wheel.
Figure 10:
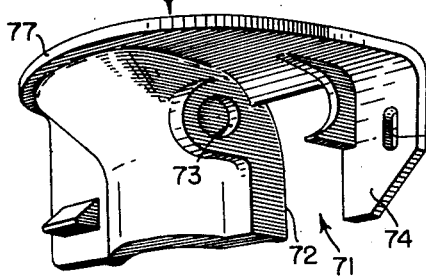
Figure 11:
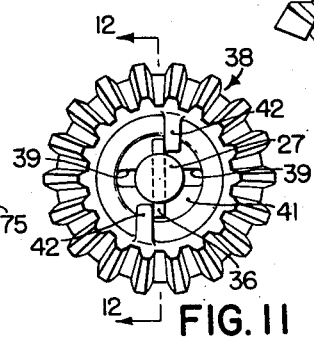

A flow controlling feed gate 90 is pivotally mounted in the hopper bottom and, as best shown in Figure 6, comprises a vane or wing section 91, a hub section 92 formed with oppositely extending trunnions 93 and 94, and a laterally outwardly extending lever-receiving arm 95, these parts preferably being integral and the gate preferably being in the form of a casting. The laterally inwardly directed trunnion 93 is adapted to be disposed in the blind opening 73 in the hopper bottom shield member 65, while the other trunnion 94 and the lever-receiving arm 95 are adapted to extend outwardly through the opening 84 in the hopper bottom 3. The other or outer gate trunnion 94 is received in and supported by a detachable bracket 97 which is adapted to be mounted on the hopper bottom 3 from the outside thereof. Preferably, the bracket 97 is in the form of an angle member, one flange 98 of which is provided with an opening 99 therein arranged to receive and support the trunnion 94. The other flange 101 of the angle member 97 is apertured, as at 102, to receive a bolt 103 which passes through the opening 102, and the registering openings 75 and 85 formed in the hopper bottom shield 65 and the hopper bottom 3. The bolt 103 therefore forms a common means for fixing the hopper bottom shield member 65 in place and, at the same time, supporting the outer trunnion 94 of the pivoted gate 90 in the hopper bottom 3.

An operating or control lever 105 is adapted to be connected to the gate arm 95, and to this end, the latter is provided with spaced apart flanges 106 and 107 between which the inner end 108 of the control lever 105 is adapted to be disposed. This end of the control lever is apertured, as at 109, to receive a bolt 111 which is disposed through the opening 109 and threaded into engagement in a tapped opening 112 in the outer end of the gate arm 95. A spring 113 is disposed between a washer 114 at the outer end of the bolt 111 and the end 108 of the arm so as to yieldingly hold the lever 105 in position relative to the gate arm 95. The control lever 105 is formed with a detent section 115 which operates along a notched sector 116 that is bolted, as at 117, to a vertical lug 118 formed on the hopper bottom 3. The spring 113 serves to hold the detent section 115 engaged with any selective notch of the sector 116 and so control the position of the gate 90.

During manufacture, the hopper bottom shield, together with the knocker and the gate, is placed in position in the hopper bottom 3 before the can 2 is attached. The assembly of these parts is materially facilitated by virtue of the fact that the gate member 90, together with its control lever receiving arm 95 and the pivotal bearing sections 93 and 94 are all formed as one integral part. In the assembly, the knocker is mounted in position with one trunnion in the opening 62 and the other trunnion in the slot 59, and then the hopper bottom shield and the gate, with its trunnion 93 in position in the blind opening 73, brought into position. Next the detachable bracket 97 is brought into position from the outside of the hopper bottom so that the opening 99 receives the outer gate trunnion 94. Then the bolt 103 is passed through the opening 75 in the hopper bottom shield 65, the opening 85 in the wall 81 of the hopper bottom 3, and the opening 102 in the bracket 97, so that when the bolt 103 is tightened, the several parts are connected together. Next the control lever 105 is assembled on the gate arm 95 and the spring 113 and associated parts mounted in position. If desired, the control lever sector 116 may be formed as an integral part of the hopper bottom 3, but preferably it is formed as a separate part and bolted thereto in order to simplify the casting of the hopper bottom 3. It will be noted that since the gate 90, together with its pivotal support and its control lever-receiving arm, is in the form of one integral part, there is no possibility of any displacement of the control lever, on the outside of the hopper, relative to the flow controlling vane 91 on the inside of the hopper.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A fertilizer distributor comprising a fertilizer container including a hopper bottom and a can secured to the upper portion of said hopper bottom, said hopper bottom having a discharge outlet, a shield member fixed directly to the hopper bottom adjacent said outlet and having a socket, a pivoted gate member having a pair of trunnions, one adapted to be seated in said socket, a bearing member having a trunnion-recess adapted to receive the other trunnion of said gate member, and attaching means for fixing said bearing member directly to said hopper bottom below said can.

2. A fertilizer hopper having a hopper bottom with an opening therein and a shield at least partially covering said opening, an adjustable gate having pivotal mounting in said shield, and common means for holding said shield to said hopper bottom and said gate in said shield.

3. A fertilizer distributor comprising a hopper having a hopper bottom with an opening therein and a hopper bottom shield provided with a slot disposed adjacent said opening, one wall of said slot having a blind opening therein, a discharge control gate disposed in said slot and having a part at one side journaled for pivotal movement in said blind opening, a detachable member having a bearing portion in alignment with the axis of said blind opening and receiving the opposite portion of said gate so as to cooperate with said blind opening in providing a pivotal support for said gate on said shield, and for fixing said detachable member directly to said hopper bottom.

4. A fertilizer distributor comprising a hopper having a hopper bottom provided with a discharge opening, a fertilizer feeding device for feeding material to said opening, a shield carried by said hopper bottom and having a trunnion-receiving opening therein adjacent the opening in the hopper bottom, a gate disposed for movement in the opening in said shield toward and away from the opening in said hopper bottom and having a pair of trunnions, one disposed in said trunnion-receiving opening in said shield, said hopper bottom having an opening through which the other trunnion extends, and a bearing bracket attached to the outer side of said hopper bottom and pivotally receiving the gate trunnion extending therethrough.

5. A fertilizer distributor as defined in claim 4, further characterized by said gate having an arm extending outwardly through the hopper bottom opening through which said other trunnion extends, a lever fixed to said arm, and a sector cooperating with said lever for causing the latter to be held in different positions of adjustment, carried by said hopper bottom.

6. A fertilizer distributor comprising a hopper bottom having a discharge opening in the lower portion and a second opening in a side portion thereof, a gate pivotally mounted in said hopper bottom adjacent said discharge opening and having and arm extending outwardly through said second opening, and means connected with said arm outwardly of said second opening for operating said gate.

7. A fertilizer distributor comprising a hopper bottom having a discharge opening in the lower portion and a second opening in a side portion thereof, a gate pivotally mounted in said hopper bottom adjacent said discharge opening and having an arm extending outwardly through said second opening, a lever connected with said arm outwardly of said second opening for operating said gate, and a sector cooperating with said lever and carried by said hopper bottom.

8. In a fertilizer distributor including a part having a hollowed interior and an opening extending outwardly through a portion of said part, a control gate comprising a main body section, a pair of oppositely disposed trunnions integral therewith, and an adjusting arm also integral with the main body section, said gate being adapted to be mounted in the interior of said part with said arm extending outwardly through said opening, said arm having a pair of spaced apart flanges, adapted to receive an operating lever therebetween.

9. In a fertilizer distributor including a part having a hollowed interior and an opening extending outwardly through a portion of said part, a control gate comprising a main body section, a pair of oppositely disposed trunnions integral therewith, an adjusting arm also integral with the main body section, said gate being adapted to be mounted in the interior of said part with said arm extending outwardly through said opening, said arm having a pair of spaced apart flanges, a lever seated between said flanges, and spring means connected between said arm and lever for yieldably holding the latter in position relative to said arm.

10. A fertilizer distributor comprising a hopper bottom having a discharge opening, a fertilizer feeding device comprising a wheel-like member rotatable in a general horizontal position on said hopper bottom adjacent said discharge opening, said hopper bottom having an upwardly and outwardly tapered configuration and an inwardly recessed portion in the lower part of the hopper including a vertical inwardly extending wall section and an adjacent material discharge opening, a shield member covering said discharge opening and a wall section adapted to lie against said vertical wall section, said wall sections having registering apertures, and attaching means extending through said apertures for fixing said shield member to the hopper bottom over said discharge opening.

11. A fertilizer distributor comprising a hopper bottom having a material discharge opening, a feed wheel rotatably mounted in the lower part of said hopper bottom, said hopper bottom having an inwardly reentrant portion at each side of said discharge opening and each of said portions including a vertical wall section having an aperture therein, a knocker disposed above said feed wheel and having a part pivoted in the aperture in one of said vertical wall sections, a shield member disposed above said discharge opening and over said knocker and the adjacent portions of said feed wheel, said shield member having a wall extension disposed adjacent the other of said vertical wall sections, and fastening means extending through the opening in said other wall section for fixing said shield to said hopper bottom.

12. A fertilizer hopper having a hopper bottom with an opening therein and a shield at least partially covering said opening, an adjustable gate having pivotal mounting at one portion in said shield, a part pivotally receiving another portion of said gate, and common means for holding said part and said shield to said hopper bottom.

13. A fertilizer distributor comprising a hopper having a hopper bottom with an opening therein and a hopper bottom shield provided with a slot disposed adjacent said opening, a discharge control gate disposed in said slot and having a part at one side mounted for pivotal movement in said shield, a detachable member having a bearing portion in alignment with the axis of the pivotal connection of said control gate part and receiving the opposite portion of said gate so as to provide a pivotal support for said gate on said shield, and for fixing said detachable member directly to said hopper bottom.

CLAUDE W. WALZ.
JAMES H. CLARK.

REFERENCES CITED

The following references are of record in the file of this patent:

UNITED STATES PATENTS

| Number | Name | Date |
|---|---|---|
| 439,495 | Everett | Oct. 28, 1890 |
| 479,637 | Everett | July 26, 1892 |
| 512,906 | Root | Jan. 16, 1894 |
| 693,527 | Love | Feb. 18, 1902 |
| 2,100,216 | Hughes | Nov. 23, 1937 |
| 2,424,168 | Hipple | July 15, 1947 |